Dec. 24, 1940.    H. W. FINK    2,225,985
HEATER UNIT
Filed July 7, 1939    3 Sheets-Sheet 1

Inventor:
Henry W. Fink,
By: Harold Olsen
Attorney

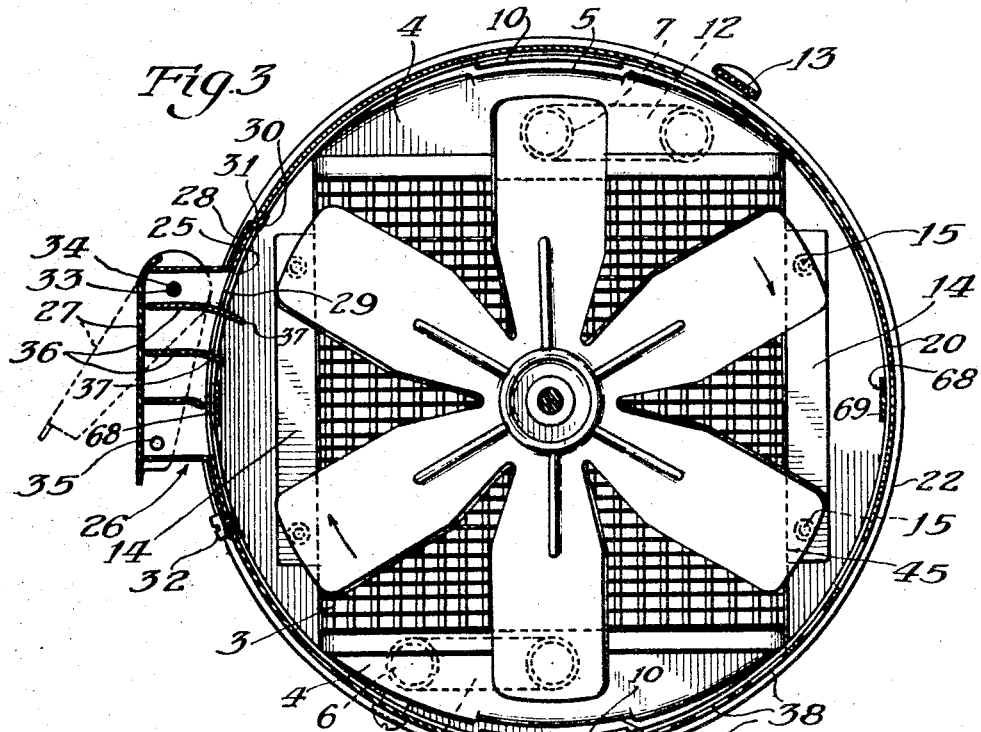
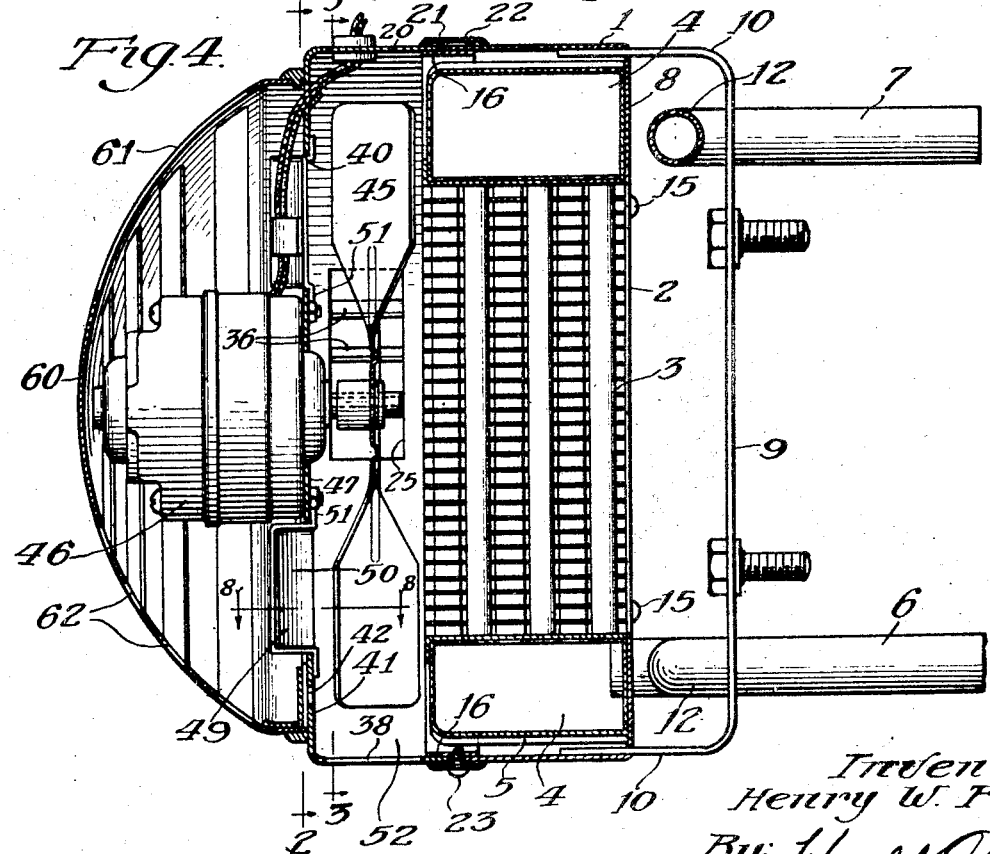

Dec. 24, 1940.   H. W. FINK   2,225,985
HEATER UNIT
Filed July 7, 1939   3 Sheets-Sheet 3

Inventor:
Henry W. Fink,
By: Harold Olsen
Attorney

Patented Dec. 24, 1940

2,225,985

UNITED STATES PATENT OFFICE 2,225,985

HEATER UNIT

Henry W. Fink, Chicago, Ill., assignor to Tropic-Aire, Incorporated, Chicago, Ill., a corporation of Delaware Application July 7, 1939, Serial No. 283,195

15 Claims. (Cl. 230—117)

This invention relates to improvements in unit heaters and defrosters. The invention is embodied in an automobile heater adapted to be connected with the circulating fluid of the engine cooling system.

These heaters are ordinarily applied to the dash and inside of the driver's compartment, and various adjustments of the heater often have to be made to properly position certain air delivery outlets in relation to the floor or to the windshield.

The present heater is adapted for furnishing heated air for the passengers, and also for furnishing heated air for defrosting the windshield. For defrosting the windshield, a conduit is used which is connected to the delivery opening of the heater and which delivers to the windshield. In making these connections it is necessary, according to the particular installation, to have the defrosting delivery opening in some certain position. These heaters are also provided with openings which deliver air to the floor for warming the feet and the opening or openings for delivering this air also have to be adjusted.

It is therefore an object of this invention to provide a heater in which the aforesaid adjustments can be made after the heater is attached to the dash.

Another object of the invention is to provide air straighteners across which the fan blows air for delivery to the passenger compartment.

It is also an object of the invention to facilitate assembly of the radiator structure and to provide a unit heater having two sections, one of which sections contains the radiator, and the other of which is detachably mounted on the section which contains the radiator, and which contains the motor and the fan.

Another object is to make the section which has the motor and fan adjustable on the section which has the radiator, and to provide this adjustable section with openings through which air is delivered axially to the passenger compartment and through which air is delivered radially, either to the windshield or to the floor, or to both. All of the last-named elements, therefore, are circularly adjustable with reference to the radiator.

Another object of the invention is to provide a grill arranged forwardly of the radiator in direction of delivery of air to the passenger compartment, this grill acting as a cover for the fan motor, which motor projects forwardly and outside of the adjustable section in a position remote from the radiator.

Another object is to provide means by which this grill may be rotatably adjusted to dispose its symmetrical and ornamental grill openings in some desired position which is most pleasing to the eye, it being understood that this adjustment follows that of the adjustment of that section which carries the delivery openings.

Objects, features and advantages of the invention will appear in the description of the drawings forming a part of this specification, and in said drawings:

Figure 3 is a vertical cross-section on line 3—3 of Figure 4, looking toward the fan and the radiator, and taken through the openings respectively for delivering heated air to the windshield and floor;

Figure 4 is a vertical, longitudinal section on line 4—4 of Figure 1;

Figure 5:
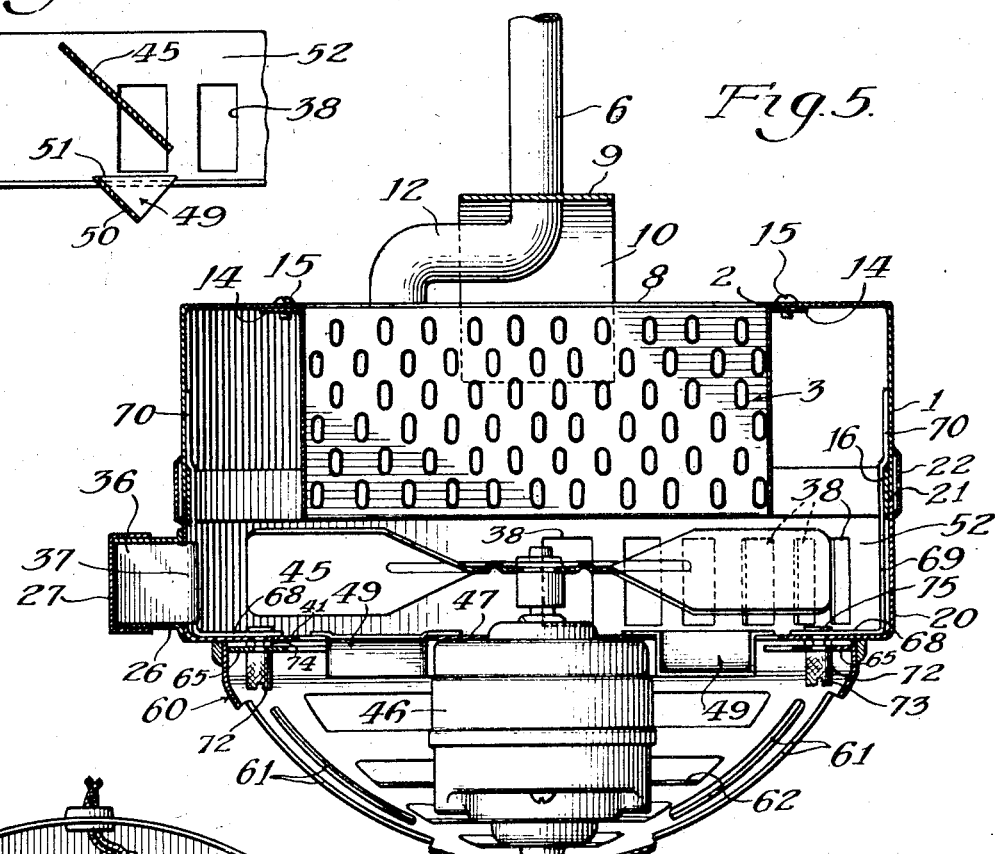
Figure 5 is a horizontal, longitudinal section taken on line 5—5 of Figure 1.
Figure 7:
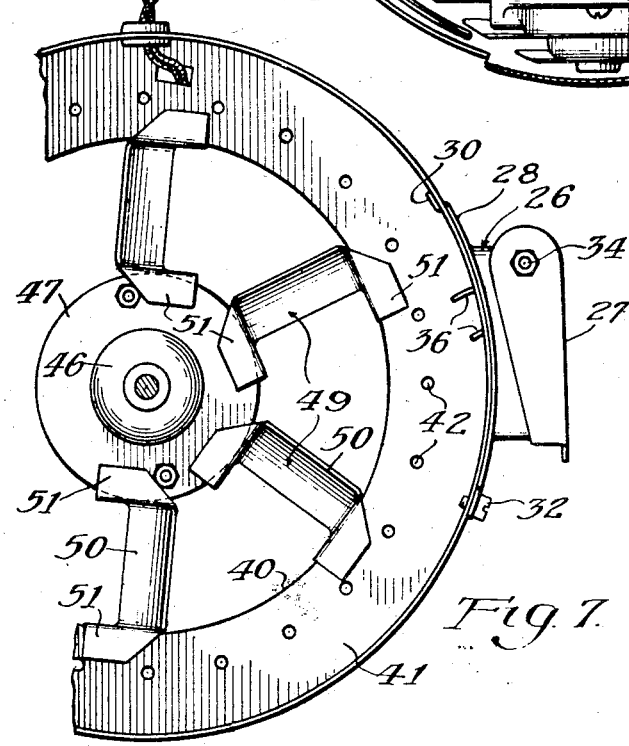
Figure 7 is a partial elevation of the inner face of the second section with the fan removed.

Referring to the drawings, the numeral 1 indicates the first casing section adapted to be placed next to the dash and attached to the dash. This casing section has an air intake opening 2 in opposition to and bridging which is a rear face of a radiator 3. As shown in Figures 4 and 5, the area of the air flow portion of the radiator is about equal to the area of the opening, and the opening in this instance is square.

Referring to Figure 3, the radiator has the usual manifolds 4. These manifolds are recessed as at 5 to receive the ends of a pipe brace later described. The radiator is arranged as shown and has leading therefrom pipes 6, 7 which pass through elongated slots in the rear face 8 of the casing section 1, and are connected with the cooling system of the engine (not shown). A pipe brace and heater-attaching member 9 has legs 10 passing openings in the rear face 8 and secured in any suitable manner as by welding, to the inner surface of the cylindrical wall of the first casing section 1. These legs lie in the recesses 5 of the manifolds. The pipes 6, 7, after being bent and re-bent as generally indicated at 12 in Figure 5, pass through this brace member in the manner shown. The radiator manifold has a nipple 13 closed by a suitable removable cap. The radiator has flanges 14, and screws 15 secure them to the back wall 8.

The forward side of the first casing has therein a band 16 projecting forwardly for the telescopic reception of the rear portion of a second casing section 20. This second section is rotatable upon the first section about an axis which corresponds to the axis of rotation of a fan later to be described. Covering the meeting line 21 between the meeting edges of the sections and providing finish is a split band 22 which laps or engages both casing sections and bridges the line 21. Referring to Figure 4, each end of the band is held by means of a screw 23 which passes only through the first casing section 1 and the band 22.

Now referring to Figure 3 the second casing section 20 is provided with openings through which air is radially delivered by a fan, later to be described. The opening 25 at the left of Figure 3 is adapted either to receive a conduit connection by which air is led to the windshield, or air passing through the opening can be directed to the floor. The opening 25 in the casing section 20 communicates with a rectangular tubular structure applied to the cylindrical surface of the section 20. This structure is generally indicated at 26, and in combination with the fan is a feature. The structure has a pivoted cover 27 having side flanges. The cover can be swung to any desired position, one such position being shown by dotted lines in the figure. The tubular structure 26 rises from a base plate 28 having an opening 29 therein in register with opening 25. The base plate has a finger extension 30 which passes through an opening 31 in the section 20. At the opposite end of the base plate 28 a screw 32 secures the same. The structure 26 is therefore easily removed. The cover 27 can be removed and the receiving end of a defrosting conduit (not shown) can be attached by means of the openings 33 for the pivot 34 and by means of openings 35 provided for that purpose.

A series of partitions 36 are arranged in the boxing 26 as best shown in Figure 3, the inner ends of each partition being curved as shown at 37. Some of the partitions project into the section 2 and the concave faces of the partitions face in the direction of approach of the on-coming blades of the fan. This is a feature. The section 20 is also provided with a series of openings 38 forming a kind of grill through which air is forced downwardly to the feet of a passenger. The structure 26 and its cover 27 can also be used for directing air toward the driver's feet.

A feature of the invention above described is that of making the section 20 adjustable on the element 1 so that the openings 25 or 38 may be adjusted to any desired position. Another feature is the mounting of the motor and fan on the element 20 so that this assembly can easily be placed upon the section 1. This scheme provides a very desirable assembly construction. It will be seen that the motor and fan are mounted in the element 20, the radiator is mounted in the element 1. Elements 1 and 20 can be assembled and held in any desired angularly adjusted relation by means now to be described.

Figure 2:
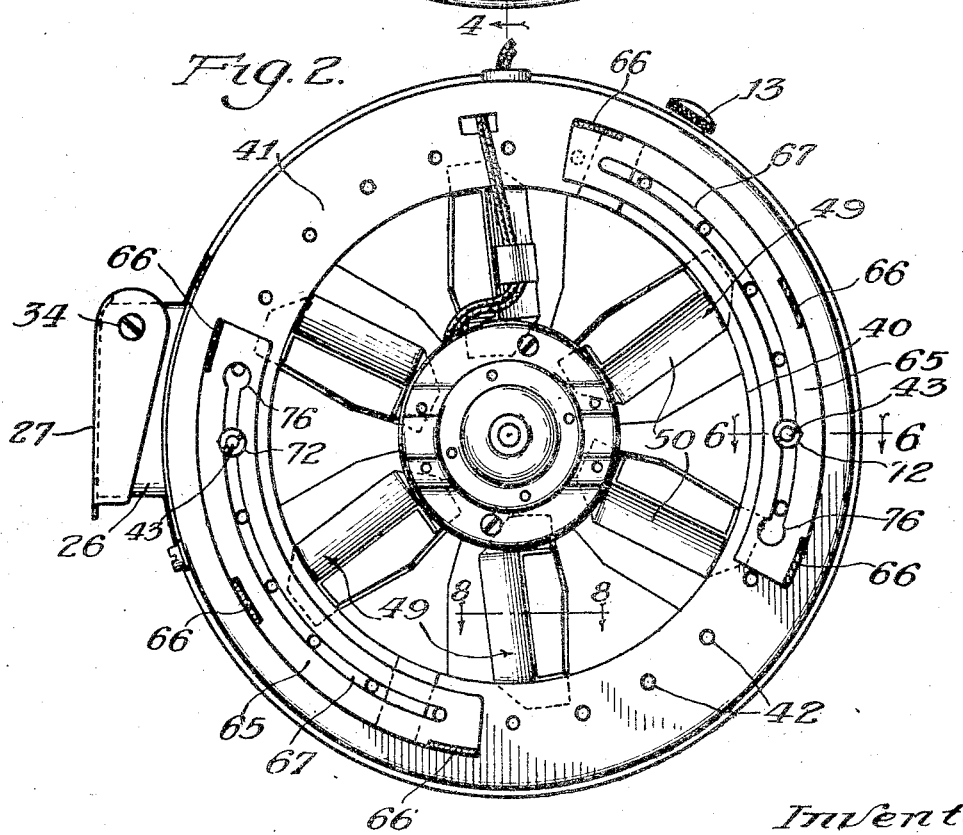
Figure 2 is a vertical cross-section on line 2—2 of Figure 4, showing the attaching and adjusting portions of the grill, and illustrating its manner of circular adjustment.

The forward part of the section 20 has an air delivery opening 40, and since this opening is of smaller diameter than the outer diameter of the section 20, an annular flange 41 is formed, well shown in Figures 2 and 4. This flange is provided with a row of circumferentially spaced openings 42 which function to receive diametrically disposed screw posts 43 which are connected with section 1, by means of straps including parts 68, 69, said straps being attached as at 70 to section 1. These parts 43 serve a dual purpose, described and claimed.

Figure 8:
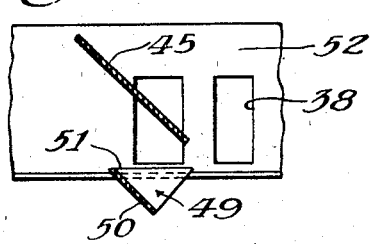
Figure 8 is a detailed section on line 8—8 of Figures 2 and 4, showing the relation of the fan to one of the air flow directing elements.

The fan is generally indicated at 45 and the motor is indicated at 46. The motor is detachably mounted on a plate 47 and this plate is centered in the opening 40 and is connected to the flange 41 by means of air flow directing elements 49, in this instance six in number. Each air director or straightener is formed by bending a flat piece of metal, as best shown in Figures 2 and 8, to provide a central, radially related portion 50 whose faces of greatest area lie in a plane which is angularly related to the plane of the front face of the section 20. The inclination of these faces (see Figure 8) is about the same as that of the inclination of the fan blades so that when the blades are in opposition to the deflectors or straighteners the surfaces of greatest area of the deflectors and the surfaces of greatest area of the fan blades are substantially co-planar. It will, of course, be understood that while this relation is claimed, the invention is not entirely limited thereto because the air flow directing members may assume other angles and relations. Each straightener element is provided with two extensions 51, one of which lies at the inside of the flange 41 and the other of which lies inside of the motor support 47. The flanges are suitably secured as by welding. The air flow elements may be formed of one piece with the section 20.

It will be noted that the motor extends forwardly beyond the forward or front face of the section 20, and that the fan operates within a plenum chamber 52 formed between the flange 41, the forward face of the radiator, and the cylindrical wall of the section 20. The fan in this instance has six blades corresponding to the number of air flow directing elements 49. The fan has a dual function. It forces air axially through the opening 40 for delivery to the passengers and also forces air radially through the openings 25 and 35, for windshield and floor heating.

It will now be seen that the casing element 20 can be rotatively adjusted and held at any adjusted position by means of the posts 43 traversing openings 42. The openings 25 and 38 are correspondingly adjusted. Another feature is that the elements for the casing sections 1 and 20 are easily assembled therein from the fully open side of each section, and then after this assembly the elements 1 and 20 are brought together and secured. When the installation is made on the car the section 20 can be separated and then rotated to bring the discharge openings 25 and/or 38 to the desired position, after which the posts 43 are registered with the proper openings 42 and secured, as shown in Figure 6.

Another feature of the invention relates to the arrangement of the motor forwardly and outside of the casing 20, and to the provision of an ornamental grill for covering the motor, this grill providing openings for the delivery of heated air to the passengers and also acting as an ornamental finishing device for the front of the heater. The grill openings have a symmetrical ornamental pattern, the elements of which, in order to give the most pleasing effect, must assume a predetermined relation, for which adjustment is made after the adjustment of section 20 and section 1.

Figure 1:
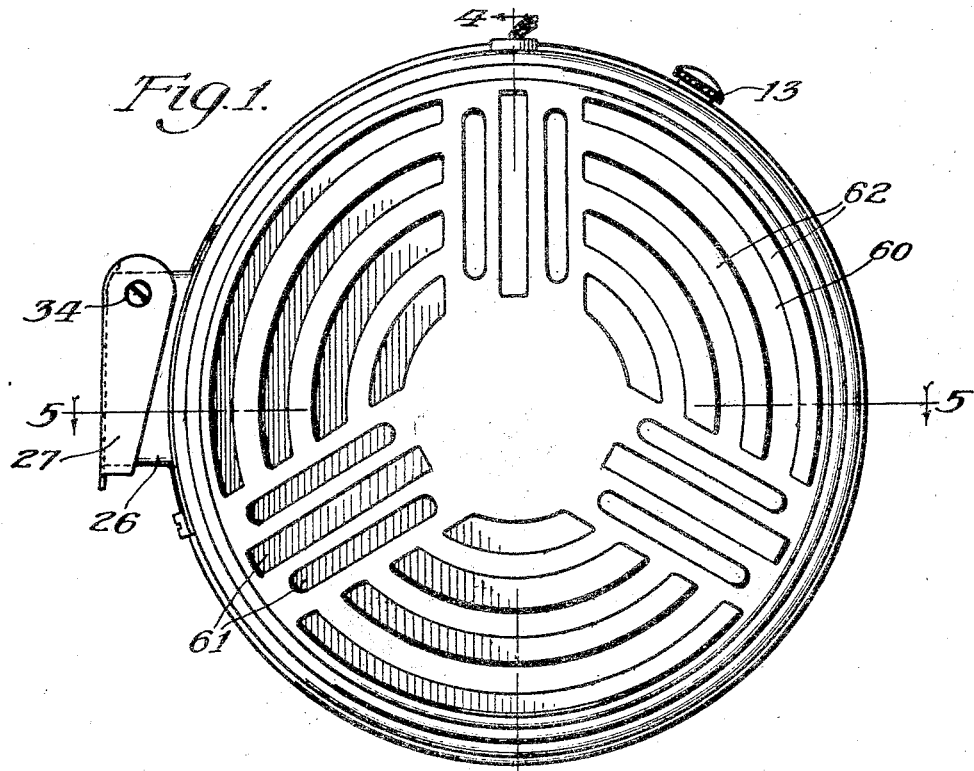
Figure 1 is a front view with heater with the grill in place and adjusted in symmetrical relation.

Referring to Figure 1, the grill is indicated at 60 and in this instance is provided with three radial groups of slots 61 symmetrically placed in the manner shown. Between these groups are arranged three series of circumferential slots, these slots being indicated at 62.

Figure 6:
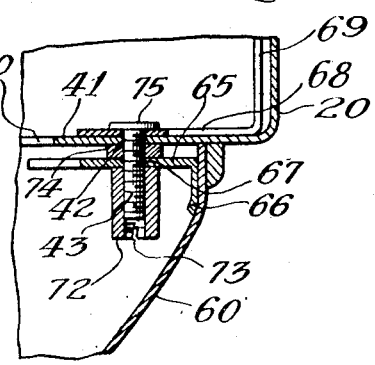
Figure 6 is a detailed horizontal section taken on line 6—6 of Figure 2 showing detail of the means by which the grill is adjusted and clamped in adjusted position, and showing part of the means by which the second section is secured to the first section.

Referring to Figures 2, 5 and 6, and particularly to Figures 2 and 6. The grill 60 is provided interiorly with a pair of arcuate members 65 suitably secured thereto by flanges 66 which may be secured by spot-welding. Each arcuate member is provided with an arcuate slot 67 through which passes one of the posts 43. The post 43 also passes through an opening 42 of the flange 41, and through one bent end 68 of a strap (see Figure 5), the other terminal 69 of which strap extends through the section 20 and into section 1 where it is attached as at 70 to said section 1. Suitable cylindrical nuts 72 engage the threaded post 43. The nuts 72 are knurled. Each also has a screw driver slot 73 by which it can be forced into clamping position. A nut 74 secures the post 43, the head 75 of said post screw being drawn against the strap portion 68, and both being drawn by the nut 74 against the flange 41. In this embodiment two diametrically related openings 42 receive the correspondingly related posts 43, and by this means the openings 25 and 35 may be brought to and held in any desired angular position.

In order that the grill may be removed the slots 67 are keyhole slots having an enlarged terminal circular portion 76 of such diameter that the cylindrical nut 72 will pass therethrough to allow removal of the grill. In assembly the circular slots 76 are registered with the nuts 72 and then the grill is pushed inwardly until the flange 65 passes the inner end of the cylindrical nuts 72, and until the flange engages the outer face of the nut 74, after which the grill is rotated to any desired position to bring its pattern, whatever symmetrical pattern may be used, into a symmetrical position which will be pleasing to the observer (see Figures 1 and 2).

The circumferential row of openings 42 represent only one means of fastening the second casing section 20 in any adjusted position, it being noted that the screws or stems 42 are two in number and diametrically related to the axis of rotation of the casing section 20, and also in this instance to the axis of rotation of the fan. It is conceived that other means may be used for securing the casings together after adjustment, so that while the detailed construction is claimed, the invention is also more broadly claimed.

Another feature of this invention relates to the arrangement of the motor projecting forwardly and outside of the front of the main casing, where it is in a position to cool more quickly when the fan is stopped after a period of use. Associated with this feature is the feature of the grill 60, or its equivalent, attached to the casing and surrounding the motor, the grill being of an ornamental nature but allowing free circulation of air to and around the motor. Thus the motor is taken out of the main casing and placed in such position as not to be submitted to direct heat of the heater, and where it is in free communication with the air of the vehicle so that its heat may be more quickly dissipated.

Referring to Figure 3, another feature of the invention relates to the use of the partition elements 36 arranged to form a series of passages communicating with the plenum chamber, with the partitions curved in the particular direction shown, in relation to the fan blades. The fan normally rotates in clockwise direction as viewed in Figure 3 and forces the air outwardly in an axial direction through the opening 40 and openings in the grill, and also forces air from the plenum chamber in a radial direction. It has been found in practice that the use of the partition elements 32 with their ends curved as shown obtains a better delivery through the boxing 26. It is noted that the top partition is longer than the others and that it projects into the plenum chamber. The next lower partition also projects into the plenum chamber, but the lowest and shortest partition does not so project.

The above described invention provides a number of valuable features. The radial discharge openings of the heater can be circularly or angularly adjusted to any angular position, after the heater has been attached to the dash, so that these openings will assume any desired relation to a conduit leading to the windshield, or to the floor of the vehicle. The placement of the motor outside of the main casing has the advantage that the motor can more quickly dissipate its heat, than when it is enclosed in the same casing with the radiator. By providing means for circularly or angularly adjusting the grid, its ornamental design can be made to occupy its most pleasing position from the standpoint of symmetry. There is an advantage in utilizing air flow directing members for securing the motor. There is considerable advantage in manufacture, in being able to assemble the parts by free introduction into the fully open end or side of a casing as is possible herein, in regard to the motor, air flow directing members and fan. On the other hand, the radiator is assembled from the open end of the other casing section 1, and after both assemblies have been independently made, the final assembly of the two casings is made. Another advantage is the utilization of fastening devices which hold the two casing sections together as part of the means for holding the grill in adjusted position. Another advantage is that given by the arrangement of the baffles and passages in the radially disposed air delivery opening so that the relatively feeble radial air delivery action of a fan of the propeller type is substantially increased. Another advantage is that the openings for the pivot of the cover for the tubular delivery member through which the fan delivers air radially can, with the other openings, be utilized for the attachment of a coupling through which air can be delivered to the windshield. Another advantage is the simple manner of assembling the radiator, by placing its rear face in substantially co-planar relation of the rear face of the rear casing section 1. Another advantage herein gained is compactness in direction from front to back of the heater.

I claim as my invention:

1. A unit comprising, a first casing section, a second casing section adjustably rotatable on the first section, and having two delivery openings, one axially and the other radially disposed, said second section having openings circumferentially disposed in relation to its axis of rotation, said sections having means adapted to pass through some of said openings to secure said second section in any one of a plurality of positions against rotation, a fan for simultaneously forcing air through both delivery openings of said second section, a motor operating the fan, and baffling means, including elements supportingly connected with the motor and with said second section and acting on air forced by said fan for passage through said axially disposed delivery opening.

2. A unit comprising a casing, a fan and motor in the casing, means forming a plenum chamber in said casing and in which said fan is disposed, an air discharge opening in said casing radially related to the fan and communicating with said plenum chamber and into which said fan forces the air, and a series of partitions within said opening defining a series of delivery passages also communicating with the plenum chamber.

3. A unit comprising a casing, a fan and motor in the casing, means forming a plenum chamber in said casing and in which said fan is disposed, an air discharge opening in said casing radially related to the fan and communicating with said plenum chamber and into which said fan forces the air, a series of partitions within said opening defining a series of discharge passages also communicating with the plenum chamber, certain of said partitions projecting into said plenum chamber and having concave faces which are faced in the direction of approach of the blades of the fan as it rotates.

4. A unit having a casing having an air delivery opening, a fan within the casing adapted to force air through said opening, a motor for the fan and air flow directing members disposed in the path of delivery of the forced air and supportingly connected by their inner ends to a plate which lies in the opening, and by their outer ends to the casing at the opening, one end of the motor being detachably secured to the outer face of the plate.

5. A device of the class described comprising, three casing elements, one a main casing adapted to be immovably attached to a support, a second casing rotatable on the main casing and providing a plenum chamber, a third casing rotatable on the second casing and constituting a grill, said main and second casings having alined openings through which air may be forced, air forcing means in the second casing for discharging air from a radial discharge opening of the second casing, and means including superposed openings in the second and third casings by which the second casing can be rotatably adjusted and held at different positions on the main casing, and by which the grill can be rotatably adjusted and held at different positions on the second casing.

6. In a device of the class described, first and second casings, the second casing having a radial discharge opening, a fan in said second casing for forcing air through said opening, securing openings on the second casing, projections on the first casing entering said openings whereby the second casing can be rotatably adjusted on the first and held in any one of a plurality of positions, a grill having arcuate slotted portions which said projections also enter, and means cooperable with the projections for securing said second casing to the first casing and for securing said grill to the second casing, said arcuate slots permitting the grill to be rotatably adjusted about said projections.

7. In a device of the class described, first and second casings, the second casing having a radial discharge opening, a fan in said second casing for forcing air through said opening, securing openings on the second casing, projections on the first casing entering said openings whereby the second casing can be rotatably adjusted and held in any one of a plurality of positions, a grill having openings which said projections also enter, and means cooperable with the projections for securing said second casing to the first casing and for securing said grill to the second casing.

8. A unit comprising, first and second sections, the second rotatably adjustable on the first, said second section having two delivery openings, one axially and the other radially disposed, a fan adapted to force air through both openings, a grill rotatably adjustable on the second casing and through which said air is axially delivered, and means in part common to said second section and said grill attaching said second section to the first section and attaching said grill to said second casing so that each may be rotatably adjusted conformably to the adjustment of the other, and so that both may be adjusted with reference to the first section.

9. In a unit, a first casing section, a second casing section adjustably rotatable on the first casing, said second section having discharge openings, one radial and one axial and also having a series of openings by which to adjustably secure the second in relation to the first section, said second section having rigid projections adapted to pass through some of said series of openings to secure the second section in any one of a plurality of adjusted positions, said second section having thereon means for forcing air through said discharge openings, an ornamental grill of symmetrical configuration attached to said second casing and through which air from the axial opening is discharged, and means by which the grill is rotatably adjusted, including slots traversed by the projections of the first casing section.

10. A unit comprising first and second casing sections, the second casing section rotatable on the first and having a radial discharge opening, a grill rotatable on the second casing section and means by which the second section and the grill can be independently rotatably adjusted and secured at any one of a plurality of adjusted positions, including projections on the first section which pass through openings respectively in the second casing and grill, and air propelling means adapted to deliver air through said discharge opening.

11. A unit comprising a casing having a fan therein, said casing having an end wall having opening through which the fan delivers air in an axial direction, a motor mounting plate disposed in the plane of the opening, a fan-operating motor having one end detachably secured to said plate, and extending outwardly beyond the wall and opening in an axial direction, and air flow directing members having their outer ends attached to the casing and having their inner ends secured to said plate.

12. In a device of the class described, first and second casings, openings in the second casing, projections on the first casing entering said openings so that the second casing can be rotatably adjusted and held in any one of a plurality of positions, a third casing having openings which said projections also enter to allow said third casing to be rotatably adjustable on the second casing and held at any one of a plurality of positions, and means cooperable with the projections after passage through said openings and adapted to releasably secure said second casing to the first casing and said third casing to said second casing, both against rotative and axial motions.

13. A unit comprising a first casing, a second casing rotatable on the first casing and a third casing rotatable on the second casing, means secured to the first casing and having portions traversing openings respectively in the second and third casings, said openings being cooperable with said portions in a manner to permit a plurality of rotatable adjustments of the second casing on the first, and of the third casing on the second, and means releasably cooperating with each of said portions and with said second and third casings to secure the third to the second casing and to secure the second to the first casing against motions both rotatively and in the direction of the rotative axes of the casings, said last mentioned means when successively properly released permitting either successive removal of the third from the second casing and of the second from the first casing, or successive rotative adjustments of the casings in the same order.

14. A unit comprising a first casing, a second casing rotatable on the first casing, and a third casing rotatable on the second casing, means secured to the first casing and having portions traversing openings respectively in the second and third casings, said openings being cooperable with said portions in a manner to permit a plurality of rotatable adjustments of the second casing on the first, and of the third casing on the second, and means releasably cooperating with each of said portions and with said second and third casings to secure the third to the second casing and to secure the second to the first casing against motions both rotatively and in the direction of the rotative axes of the casings, said last mentioned means when successively released permitting successive removal of the third from the second casing and of the second from the first casing.

15. In a device of the class described, a first casing, a second casing having a telescopic fit with the first casing and rotatably adjustable thereon, a pair of straps as part of and secured within and extending beyond the first casing and into the second casing and having terminal projections, openings in the second casing arranged to be received by said projections to hold the second casing in any one of a plurality of rotatably adjusted positions, and means releasably cooperating with said projections after the same have passed through the openings, to secure said second casing in an adjusted position and against movement in an axial direction whereby to hold said casings in telescopic relation.

HENRY W. FINK.